(12) United States Patent
Fu et al.

(10) Patent No.: US 12,411,249 B2
(45) Date of Patent: Sep. 9, 2025

(54) CAPABILITY OBTAINING AND SENDING METHOD, POSITIONING SERVER AND DEVICE (71) Applicant: DATANG MOBILE COMMUNICATIONS EQUIPMENT CO., LTD., Beijing (CN)

(72) Inventors: Jing Fu, Beijing (CN); Jianxiang Li, Beijing (CN); Haiyang Quan, Beijing (CN); Dajun Zhang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 442 days.

(21) Appl. No.: 17/916,527

(22) PCT Filed: Mar. 30, 2021

(86) PCT No.: PCT/CN2021/083910
§ 371 (c)(1),
(2) Date: Sep. 30, 2022

(87) PCT Pub. No.: WO2021/197314
PCT Pub. Date: Oct. 7, 2021

(65) Prior Publication Data
US 2023/0152470 A1 May 18, 2023

(30) Foreign Application Priority Data
Apr. 1, 2020 (CN) .......................... 202010252396.4

(51) Int. Cl.
G01S 19/08 (2010.01)
G01S 19/07 (2010.01)
H04W 4/029 (2018.01)

(52) U.S. Cl.
CPC ............ *G01S 19/08* (2013.01); *G01S 19/074* (2019.08); *H04W 4/029* (2018.02)

(58) Field of Classification Search
CPC ... H04W 64/00; H04W 4/029; H04W 64/006; H04W 4/02; H04W 64/003; H04W 12/63;
(Continued)

(56) References Cited

U.S. PATENT DOCUMENTS

2011/0098057 A1* 4/2011 Edge ...................... H04L 67/52
455/456.1
2012/0088518 A1* 4/2012 Edge ..................... H04W 64/00
455/456.1
(Continued)

OTHER PUBLICATIONS

Extended European Search Report for the corresponding European Patent Application No. 21779443.7 issued by the European Patent Office on Jan. 15, 2024.
(Continued)

*Primary Examiner* — Kwasi Karikari
(74) *Attorney, Agent, or Firm* — Ladas & Parry, LLP (57) ABSTRACT The present disclosure provides a capability obtaining method, a capability sending method, a positioning server, and a device. The capability obtaining method is applied to the positioning server and includes: obtaining integrity capability information sent by a first device; wherein the integrity capability information is used for assisting the positioning server in performing a positioning operation, and the first device is a terminal or an access network side node; wherein the integrity capability information is used for indicating at least one of the following: a capability to support an integrity; a capability to support monitoring the integrity of a target object, indicating that the first device is capable of monitoring the integrity of the target object; or a capability to support a first-device-based integrity application of the target object.

16 Claims, 3 Drawing Sheets (58) Field of Classification Search
CPC ..... H04W 4/025; H04W 4/027; H04W 76/50; H04W 36/324
See application file for complete search history.

(56) References Cited

U.S. PATENT DOCUMENTS

2020/0169831 A1* 5/2020 Li ........................... G01S 19/43
2021/0120517 A1* 4/2021 Akkarakaran ........ G01S 5/0242

OTHER PUBLICATIONS

"Views on Rel-17 Positioning Enhancements," 3GPP TSG RAN Meeting #85, RP-191919, Newport Beach, CA, USA, Sep. 16-20, 2019, Agenda Item: 8.1.9 Positioning, Source: Swift Navigation.
3rd Generation Partnership Project; Technical Specification Group Radio Access Network; Evolved Universal Terrestrial Radio Access (E-UTRA); LTE Positioning Protocol (LPP) (Release 15) 3GPP TS 36.355 V15.5.0 (Sep. 2019).

* cited by examiner

CAPABILITY OBTAINING AND SENDING METHOD, POSITIONING SERVER AND DEVICE

CROSS-REFERENCE TO RELATED APPLICATIONS

The present application is a U.S. national phase application of a PCT Application No. PCT/CN2021/083910 filed on Mar. 30, 2021, which claims a priority to the Chinese patent application No. 202010252396.4 filed in China on Apr. 1, 2020, the disclosures of which are incorporated herein by reference in their entireties.

TECHNICAL FIELD

The present disclosure relates to the field of communication technology, in particular to a capability obtaining method, a capability sending method, a positioning server, and a device.

BACKGROUND

When the accuracy of a positioning service meets the requirements of quality of service (QoS), sometimes the error of location estimation is very large, this situation cannot be addressed in the related art. In a positioning business scenario involving the safety of life and property and potential legal liability, if the positioning error is too large at one time, it may have a serious impact and cause bad consequences. Therefore, it is necessary to improve the mechanisms in the related art, limit the occurrence of extremely large error points, and avoid the occurrence of such incidents.

SUMMARY

Embodiments of the present disclosure provide a capability obtaining method, a capability sending method, a positioning server, and a device, to solve the problem in the related art that the positioning error cannot be reduced where the accuracy of the positioning service meets the QoS requirements.

In order to solve the above technical problem, some embodiments of the present disclosure provide a capability obtaining method, effected by a positioning server, including:
obtaining integrity capability information sent by a first device;
wherein, the integrity capability information is used for assisting the positioning server in performing a positioning operation, and the first device is a terminal or an access network side node;
wherein, the integrity capability information is used for indicating at least one of the following:
a capability to support an integrity;
a capability to support monitoring the integrity of a target object, indicating that the first device is capable of monitoring the integrity of the target object; or
a capability to support a first-device-based integrity application of the target object;
wherein, the target object includes: a first positioning manner and/or first positioning assistance data.
Specifically, the capability to support the integrity includes at least one of the following:
a capability to support an integrity based on a second positioning manner; or
a capability to support an integrity based on a first positioning reference signal.

Further, the first positioning manner and the second positioning manner each include at least one of the following:
global navigation satellite system (GNSS) positioning manner;
Bluetooth positioning manner;
terrestrial beacon system (TBS) positioning manner;
sensor positioning manner;
downlink time difference of arrival (DL-TDOA) positioning manner;
uplink time difference of arrival (UL-TDOA) positioning manner;
multi-round round trip time (Multi-RTT) positioning manner;
downlink angle-of-departure (DL-AoD) positioning manner; or
uplink angle-of-arrival (UL-AOA) positioning manner.

Specifically, the capability to support the first-device-based integrity application of the target object includes at least one of the following:
a capability to support an evaluation of the integrity of the target object, indicating that the first device is capable of providing an integrity monitoring result of the target object;
a capability to support an integrity exclusion of the target object, indicating that the first device is capable of excluding the target object not meeting an integrity requirement or retaining the target object meeting the integrity requirement; or
a capability to support an integrity correction of the target object, indicating that the first device is capable of providing the integrity correction of the target object.

Optionally, the obtaining the integrity capability information sent by the first device includes:
sending integrity capability request information to the first device;
receiving the integrity capability information fed back by the first device according to the integrity capability request information.

Optionally, the obtaining the integrity capability information sent by the first device includes:
receiving the integrity capability information reported proactively by the first device.

Some embodiments of the present disclosure further provide a capability sending method, effected by a first device, including:
sending integrity capability information to a positioning server, the integrity capability information being used for assisting the positioning server in performing a positioning operation;
wherein, the first device is a terminal or an access network side node;
wherein, the integrity capability information is used for indicating at least one of the following:
a capability to support an integrity;
a capability to support monitoring the integrity of a target object, indicating that the first device is capable of monitoring the integrity of the target object; or
a capability to support a first-device-based integrity application of the target object;
wherein, the target object includes: a first positioning manner and/or first positioning assistance data.
Specifically, the capability to support the integrity includes at least one of the following:

a capability to support an integrity based on a second positioning manner; or a capability to support an integrity based on a first positioning reference signal.

Further, the first positioning manner and the second positioning manner each include at least one of the following:

global navigation satellite system (GNSS) positioning manner;
Bluetooth positioning manner;
terrestrial beacon system (TBS) positioning manner;
sensor positioning manner;
downlink time difference of arrival (DL-TDOA) positioning manner;
uplink time difference of arrival (UL-TDOA) positioning manner;
multi-round round trip time (Multi-RTT) positioning manner;
downlink angle-of-departure (DL-AoD) positioning manner; or
uplink angle-of-arrival (UL-AOA) positioning manner.

Specifically, the capability to support the first-device-based integrity application of the target object includes at least one of the following:

a capability to support an evaluation of the integrity of the target object, indicating that the first device is capable of providing an integrity monitoring result of the target object;
a capability to support an integrity exclusion of the target object, indicating that the first device is capable of excluding the target object not meeting an integrity requirement or retaining the target object meeting the integrity requirement; or
a capability to support an integrity correction of the target object, indicating that the first device is capable of providing the integrity correction of the target object.

Optionally, the sending the integrity capability information to the positioning server includes:

receiving integrity capability request information sent by the positioning server;
sending the integrity capability information to the positioning server according to the integrity capability request information.

Optionally, the sending the integrity capability information to the positioning server includes:

reporting proactively the integrity capability information to the positioning server.

Some embodiments of the present disclosure further provide a positioning server, including: a memory, a processor, and a program stored in the memory and configured to be executed by the processor; wherein the processor is configured to execute the program to implement the following step:

obtaining integrity capability information sent by a first device;
wherein, the integrity capability information is used for assisting the positioning server in performing a positioning operation, and the first device is a terminal or an access network side node;
wherein, the integrity capability information is used for indicating at least one of the following:
a capability to support an integrity;
a capability to support monitoring the integrity of a target object, indicating that the first device is capable of monitoring the integrity of the target object; or
a capability to support a first-device-based integrity application of the target object;

wherein, the target object includes: a first positioning manner and/or first positioning assistance data.

Specifically, the capability to support the integrity includes at least one of the following:

a capability to support an integrity based on a second positioning manner; or
a capability to support an integrity based on a first positioning reference signal.

Further, the first positioning manner and the second positioning manner each include at least one of the following:

global navigation satellite system (GNSS) positioning manner;
Bluetooth positioning manner;
terrestrial beacon system (TBS) positioning manner;
sensor positioning manner;
downlink time difference of arrival (DL-TDOA) positioning manner;
uplink time difference of arrival (UL-TDOA) positioning manner;
multi-round round trip time (Multi-RTT) positioning manner;
downlink angle-of-departure (DL-AoD) positioning manner; or
uplink angle-of-arrival (UL-AOA) positioning manner.

Specifically, the capability to support the first-device-based integrity application of the target object includes at least one of the following:

a capability to support an evaluation of the integrity of the target object, indicating that the first device is capable of providing an integrity monitoring result of the target object;
a capability to support an integrity exclusion of the target object, indicating that the first device is capable of excluding the target object not meeting an integrity requirement or retaining the target object meeting the integrity requirement; or
a capability to support an integrity correction of the target object, indicating that the first device is capable of providing the integrity correction of the target object.

Optionally, during the obtaining the integrity capability information sent by the first device, the processor is configured to execute the program to implement the following steps:

sending integrity capability request information to the first device;
receiving the integrity capability information fed back by the first device according to the integrity capability request information.

Optionally, the processor is configured to execute the program to implement the following step:

receiving the integrity capability information reported proactively by the first device.

Some embodiments of the present disclosure further provide a device, the device being a first device, including: a transceiver, a memory, a processor, and a program stored in the memory and configured to be executed by the processor; wherein the processor is configured to execute the program to implement the following step:

sending integrity capability information to a positioning server through the transceiver, the integrity capability information being used for assisting the positioning server in performing a positioning operation;
wherein, the first device is a terminal or an access network side node;
wherein, the integrity capability information is used for indicating at least one of the following:

a capability to support an integrity;
a capability to support monitoring the integrity of a target object, indicating that the first device is capable of monitoring the integrity of the target object; or
a capability to support a first-device-based integrity application of the target object;
wherein, the target object includes: a first positioning manner and/or first positioning assistance data.

Specifically, the capability to support the integrity includes at least one of the following:
a capability to support an integrity based on a second positioning manner; or
a capability to support an integrity based on a first positioning reference signal.

Further, the first positioning manner and the second positioning manner each include at least one of the following:
global navigation satellite system (GNSS) positioning manner;
Bluetooth positioning manner;
terrestrial beacon system (TBS) positioning manner;
sensor positioning manner;
downlink time difference of arrival (DL-TDOA) positioning manner;
uplink time difference of arrival (UL-TDOA) positioning manner;
multi-round round trip time (Multi-RTT) positioning manner;
downlink angle-of-departure (DL-AoD) positioning manner; or
uplink angle-of-arrival (UL-AOA) positioning manner.

Specifically, the capability to support the first-device-based integrity application of the target object includes at least one of the following:
a capability to support an evaluation of the integrity of the target object, indicating that the first device is capable of providing an integrity monitoring result of the target object;
a capability to support an integrity exclusion of the target object, indicating that the first device is capable of excluding the target object not meeting an integrity requirement or retaining the target object meeting the integrity requirement; or
a capability to support an integrity correction of the target object, indicating that the first device is capable of providing the integrity correction of the target object.

Optionally, during the sending the integrity capability information to the positioning server through the transceiver, the processor is configured to execute the program to implement the following steps:
receiving integrity capability request information sent by the positioning server through the transceiver;
sending the integrity capability information to the positioning server, according to the integrity capability request information.

Optionally, during the sending the integrity capability information to the positioning server through the transceiver, the processor is configured to execute the program to implement the following step:
reporting proactively the integrity capability information to the positioning server through the transceiver.

Some embodiments of the present disclosure further provide a computer-readable storage medium storing thereon a computer program, wherein the computer program is configured to be executed by a processor to implement the above capability obtaining method or the above capability sending method.

Some embodiments of the present disclosure further provide a positioning server, including:
an obtaining module, configured to obtain integrity capability information sent by a first device;
wherein, the integrity capability information is used for assisting the positioning server in performing a positioning operation, and the first device is a terminal or an access network side node;
wherein, the integrity capability information is used for indicating at least one of the following:
a capability to support an integrity;
a capability to support monitoring the integrity of a target object, indicating that the first device is capable of monitoring the integrity of the target object; or
a capability to support a first-device-based integrity application of the target object;
wherein, the target object includes: a first positioning manner and/or first positioning assistance data.

Some embodiments of the present disclosure further provide a device, the device being a first device, including:
a sending module, configured to send integrity capability information to a positioning server, the integrity capability information being used for assisting the positioning server in performing a positioning operation;
wherein, the first device is a terminal or an access network side node;
wherein, the integrity capability information is used for indicating at least one of the following:
a capability to support an integrity;
a capability to support monitoring the integrity of a target object, indicating that the first device is capable of monitoring the integrity of the target object; or
a capability to support a first-device-based integrity application of the target object;
wherein, the target object includes: a first positioning manner and/or first positioning assistance data.

The beneficial effects of the present disclosure are as follows.

In the above solution, by obtaining the integrity capability information of the terminal or the access network side node, integrity can be further provided, and the problem in the related art that the positioning error cannot be reduced where the accuracy of the positioning service meets the QoS requirements can be solved, reducing errors caused by positioning.

DETAILED DESCRIPTION

In order to make the purpose, the technical solutions and advantages of the present disclosure clearer, the present disclosure will be described in detail below with reference to the drawings and specific embodiments.

In describing the embodiments of this disclosure, some of the concepts used in the following description are first explained as below.

1. Positioning Architecture

Figure 1:
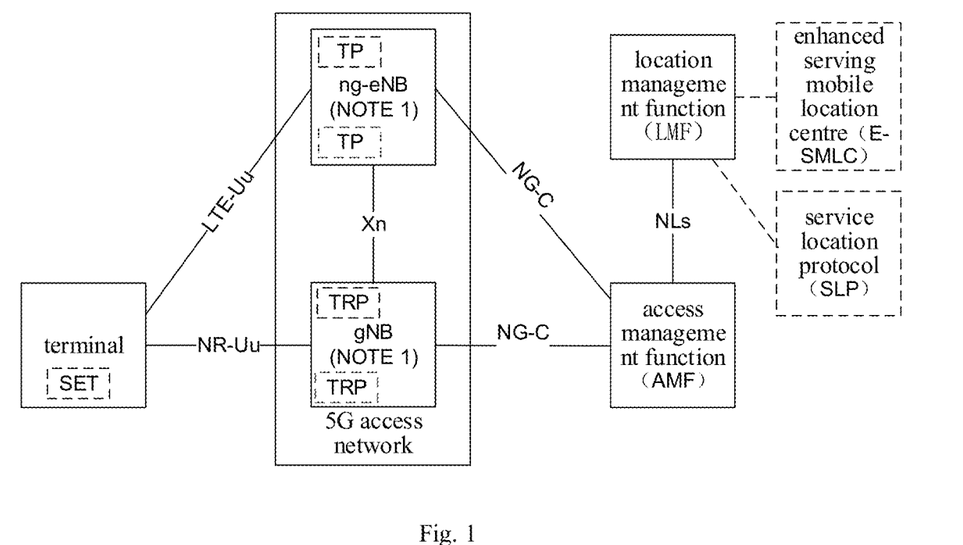
FIG. 1 is a schematic diagram of a positioning architecture applicable to NG-RAN.

FIG. 1 shows a positioning architecture applicable to a fifth generation (5G) radio access network (NG-RAN). In FIG. 1, the location management function (LMF) is a positioning server, which is responsible for selecting a positioning method and triggering corresponding positioning measurement, and may calculate the final positioning result and accuracy;

5G radio access network (NG-RAN): can send a positioning reference signal, or perform positioning measurements based on assistance information;

user equipment (UE, also referred to as terminal): can send a positioning reference signal, or perform positioning measurement based on assistance information; and can also calculate the final positioning result and accuracy based on the measurement result.

2. Positioning Capability Transmission

The positioning capabilities in the long term evolution positioning protocol (LPP) include the positioning methods supported by the target device, different aspects supported for a specific positioning method (such as supported assistance data type of the assisted global navigation satellite system (A-GNSS)) and some common positioning features that are not limited to a specific positioning method (such as the capability to handle multiple LPP transactions).

The LPP positioning capability transmission transaction may be triggered by a server request, or "reported proactively" by the target device.

Figure 2:
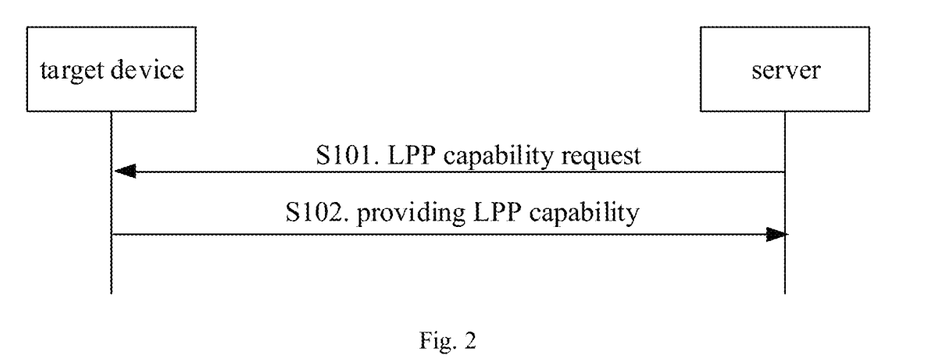
FIG. 2 is a schematic diagram of a LPP capability transmission process.

FIG. 2 shows the LPP capability transmission process (request/response), specifically including:

step S101, the server sends an LPP capability request message, to request the relevant positioning capability of the target device;

step S102, the target device transmits the relevant positioning capabilities to the server, and the capabilities may include specific positioning methods, some commonalities of positioning methods, etc.

Figure 3:
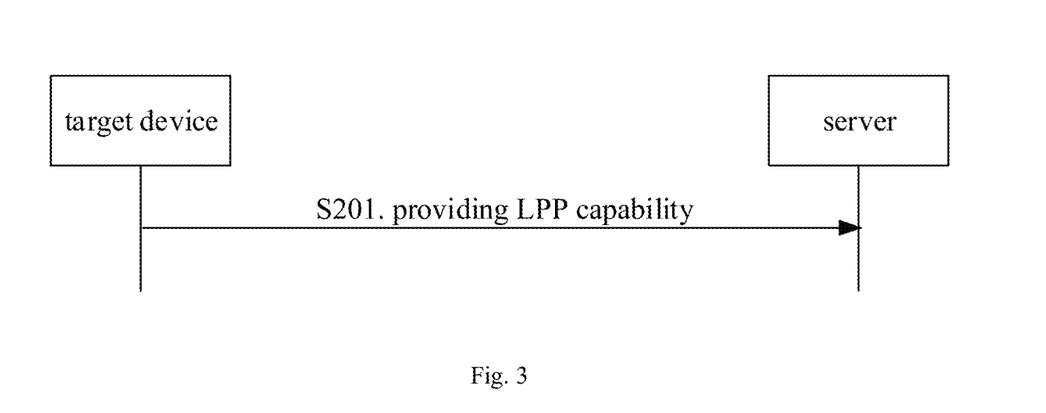
FIG. 3 is a schematic diagram of a LPP capability indication process.

In addition, the LPP capability indication process is used to proactively transmit capability information, as shown in FIG. 3.

Further, the above server refers to the LMF in the 5G positioning architecture.

3. Integrity

Integrity is information provided by the entire system and is a measure of its confidence in the positioning accuracy. The integrity requirement is that the position estimation error is to be controlled to be within a certain range, and usually there are the following types of parameters.

A11. Integrity horizontal position protection value HorizontalProtectionLevel;

it indicates the horizontal position estimation error, and it is required that the probability that the horizontal position estimation error is greater than PL should be lower than a risk requirement value (Irisk), i.e., $P(\varepsilon>PL)<Irisk$.

A12. Integrity vertical position protection value VerticalProtectionLevel;

it indicates the upper limit of vertical position error, and it is required that the probability that the vertical position estimation error is greater than PL should be lower than the risk requirement value (Irisk), i.e., $P(\varepsilon>PL)<Irisk$.

$\varepsilon$ is the actual position estimation error, and Irisk is defined as below.

A13. Integrity risk (Irisk);

Integrity risk is a probability that a positioning error exceeds a tolerance limit.

A14. Horizontal Alert Limit (HAL);

A15. Vertical Alert Limit (VAL);

they are maximum position estimation error values (horizontal and vertical position) allowed when the system can work properly. The operation becomes risky if the positioning error exceeds the limit of ProtectionLevel in any dimension or equivalent dimension. Therefore, when the system considers that it becomes unavailable to the application, it starts to alert, so as to prevent the loss of integrity.

The 3rd Generation Partnership Project (3GPP) New Radio (NR) R17 positioning enhancement function will implement integrity. Under the existing mechanism, the R16 version only meets the requirements of positioning accuracy, that is, the positioning service only supports the satisfaction of required positioning accuracy within a certain confidence interval. Quality of service requirements for integrity are not introduced. "Integrity" is a capability of the enhanced positioning system, which is suitable for various scenarios involving the safety of life and property and potential legal liability. Since 5G systems are oriented towards vertical industries, positioning services based on mobile communication networks will be used in scenarios such as autonomous driving, industrial Internet of Things, and telemedicine. In these scenarios, there are not only requirements for positioning accuracy, but also further requirements for the range of positioning errors.

There is no concept of positioning service integrity in the 3rd Generation Partnership Project (3GPP) architecture.

The present disclosure provides a capability obtaining method, a capability sending method, a positioning server, and a device, in order to solve the problem in the related art that the positioning error cannot be reduced where only the accuracy of the positioning service meets the QoS requirements.

Figure 4:
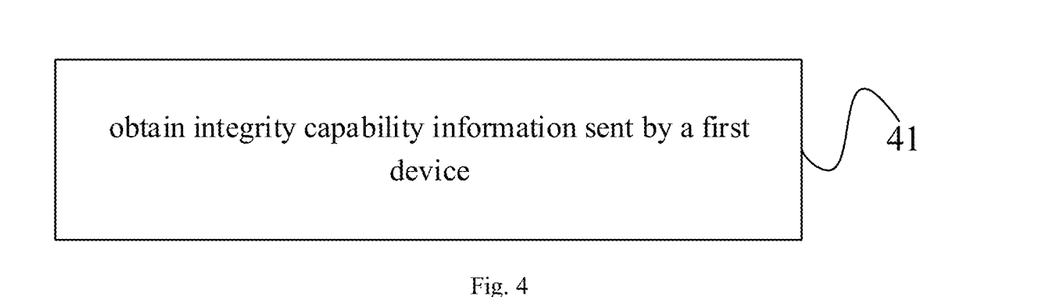
FIG. 4 is a schematic flowchart of a capability obtaining method according to some embodiments of the present disclosure.

As shown in FIG. 4, the capability obtaining method of some embodiments of the present disclosure is effected by a positioning server and includes the following step:

Step 41, obtaining integrity capability information sent by the first device;

wherein, the integrity capability information is used for assisting the positioning server in performing a positioning operation;

it should be noted here that the first device is a terminal or an access network side node (for example, the access network side node is a base station), and the positioning server may be an LMF.

It should be noted that the obtaining the integrity capability information mainly includes a proactive requesting by the positioning server and a proactive reporting by the first device. For different implementations, step 41 is specifically described as below.

1. Proactive Requesting by the Positioning Server

Specifically, in this case, the specific implementation of step 41 is:

sending integrity capability request information to the first device;

receiving the integrity capability information fed back by the first device according to the integrity capability request information.

In this case, when the positioning server needs to obtain the integrity capability information of the terminal or the access network side node, it will send the integrity capability request information to the terminal or the access network side node, and the terminal or the access network side node will feed back the integrity capability information according to the integrity capability request information after receiving the request information of the positioning server. After the positioning server receives the integrity capability information, it will perform the related positioning operations.

2. Proactive Reporting by the First Device

Specifically, in this case, the specific implementation of step 41 is:

receiving the integrity capability information reported proactively by the first device.

In this case, the first device may proactively report integrity capability information for some reasons (for example, when initiating a request for positioning assistance information), and the positioning server performs related positioning operations after directly receiving the integrity capability information.

The integrity capability information is described in detail as below.

Specifically, the integrity capability information is used for indicating at least one of following A11, A12, A13.

A11. A capability to support an integrity

It should be noted that the integrity mentioned here refers to a feature of the first device, and the capability to support the integrity refers to a capability to support the integrity feature.

It should be further noted that capability to support the integrity feature refers to that the first device supports the currently introduced integrity feature, and may provide integrity related services, for example, according to an indication of the capability to support the integrity, the positioning server knows that the first device can identify an integrity identifier, or can identify integrity related parameters, etc.

Optionally, in this case, the capability to support the integrity may further include at least one of following A111 and A112.

A111. A capability to support an integrity feature based on a second positioning manner It should be noted that the second positioning manner here includes (but is not limited to) at least one of following:

A121. global navigation satellite system (GNSS) positioning manner; specifically, this positioning manner may include at least one of the following: Global Positioning System (GPS) positioning manner, modernized GPS positioning manner, Galileo positioning manner, GLONASS positioning manner, Space Based Augmentation Systems (SBAS) positioning manner, Quasi Zenith Satellite System (QZSS) positioning manner or BeiDou Navigation Satellite System (BDS) positioning manner;

A122, Bluetooth positioning manner;

A123. terrestrial Beacon System (TBS) positioning manner;

A124. sensor positioning manner;

A125. downlink Time Difference of Arrival (DL-TDOA) positioning manner;

A126. uplink Time Difference of Arrival (UL-TDOA) positioning manner;

A127. multi-Round Trip Time (Multi-RTT) positioning manner;

A128. downlink angle-of-departure (DL-AoD) positioning manner; or

A129. uplink Angle of Arrival (UL-AoA) positioning manner.

Specifically, it should be noted that the second positioning manner refers to certain (one or several) positioning manners. For example, the second positioning manner may be: DL-TDOA positioning manner and BDS positioning manner, that is, at this time, the first device supports the integrity feature based on the DL-TDOA positioning manner and the BDS positioning manner.

This situation means that the first device supports the integrity feature for a certain positioning manner and may provide integrity related services for the positioning manner. For example, according to an indication of the capability to support integrity feature of DL-TDOA, the positioning server knows that the first device can identify the integrity identifier of the DL-TDOA, or can identify the integrity related parameters of the DL-TDOA, etc.

A112. A capability to support an integrity feature based on a first positioning reference signal Specifically, the first positioning reference signal refers to certain (one or several types) positioning reference signals, for example, it may be an uplink positioning reference signal (UL positioning SRS), or it may be a downlink positioning reference signal, etc.

This situation means that the first device supports the integrity feature for a certain positioning reference signal and may provide integrity related services for the positioning reference signal, for example, according to an indication of the capability to support the integrity feature of the uplink positioning reference signal, the positioning server knows that the first device can identify the integrity identifier in the positioning assistance information of the uplink positioning reference signal, or can identify the integrity related parameters in the positioning assistance information of the uplink positioning reference signal, etc.

A12. A capability to support monitoring an integrity of the target object

It should be noted that the capability to support monitoring the integrity indicates that the first device is capable of monitoring the integrity of the target object;

it should be noted here that the target object includes: a first positioning manner and/or first positioning assistance data.

It should be noted that the first positioning manner here is similar to the above-mentioned second positioning manner, including but not limited to at least one of A121 to A129.

Specifically, it should be noted that the first positioning manner refers to certain (one or several) positioning manners. For example, the first positioning manner may be: DL-TDOA positioning manner; that is, at this time, the first device has the capability to support monitoring the integrity of the DL-TDOA positioning manner.

Specifically, the first positioning assistance data refers to certain (one or several kinds) positioning assistance data. Further, the positioning assistance data may be, for example: Global Navigation Satellite System (GNSS) ephemeris assistance data, downlink positioning reference signal (DL PRS) positioning assistance data, etc.

That is to say, in this case, it refers to the first device's capability to support monitoring the integrity of certain positioning manner and/or support monitoring the integrity of certain positioning assistance data.

A13. A capability to support a first-device-based integrity application of the target object It should be noted here that the target object includes: a first positioning manner and/or first positioning assistance data.

Specifically, the first positioning manner and the first positioning assistance data here are the same as those defined in A12 above.

Specifically, in this case, the integrity application capability includes at least one of the following A131, A132, A133.

A131. A capability to support an evaluation of the integrity of the target object It should be noted that the capability to support the evaluation of the integrity indicates that the first device is capable of providing the integrity monitoring result of the target object.

That is to say, in this case, it refers to the first device's capability to support the evaluation of the integrity of certain positioning manner and/or support the evaluation of the integrity of certain positioning assistance data.

A132. A capability to support an integrity exclusion of the target object

It should be noted that the capability to support the integrity exclusion indicates that the first device is capable of excluding target objects that do not meet the integrity requirement or retaining target objects that meet the integrity requirement.

Specifically, when the target object is the first positioning manner, the capability to support the integrity exclusion indicates that the first device is capable of excluding positioning reference signal transmission points in the first positioning manner that do not meet the integrity requirement, or the first device is capable of retaining the positioning reference signal transmission points in the first positioning manner that meet the integrity requirement.

When the target object is the first positioning assistance data, the capability to support the integrity exclusion indicates that the first device is capable of excluding positioning assistance data not meeting the integrity requirement, or retaining the positioning assistance data meeting the integrity requirement.

That is to say, in this case, it refers to the first device's capability to support the integrity exclusion of certain positioning manner and/or support the integrity exclusion of certain positioning assistance data.

A133. A capability to support an integrity correction of the target object

It should be noted that the capability to support the integrity correction indicates that the first device is capable of providing the integrity correction of the target object.

That is to say, in this case, it refers to the first device's capability to support the integrity correction of certain positioning manner and/or support the integrity correction of certain positioning assistance data.

Some embodiments of the present disclosure are described below with reference to specific practical applications.

Situation 1. The positioning server obtaining the integrity capability of the terminal Step S11, based on the request of the positioning server, the terminal reports the integrity capability information of the terminal; or the terminal may proactively report the integrity capability information of the terminal to the positioning server for some reasons (such as when initiating a request for positioning assistance information).

The integrity capability of the terminal may include one or more of the following.

B11. A capability to support an integrity feature

Based on the indication information of the capability, the positioning server may know that the terminal supports the currently introduced integrity feature and the terminal may provide integrity related services, for example, according to the indication information of the capability, the positioning server knows that the terminal can identify an integrity identifier, or can identify integrity related parameters, etc.

B12. A capability to support an integrity feature of certain positioning manner

Based on the indication information of this capability, the positioning server may know that the terminal supports the integrity feature introduced for certain positioning manner and the terminal may provide integrity related services. For example, according to the indication information of this capability, the positioning server knows that the terminal can identify the integrity identifier in the DL-TDOA positioning manner, or can identify the integrity related parameters in the DL-TDOA positioning manner, etc.

B13. A capability to support an integrity feature of certain positioning reference signal Based on the indication information of the capability, the positioning server may know that the terminal supports the integrity feature introduced for certain positioning reference signal and the terminal may provide integrity related services, for example, according to the indication information of the capability, the positioning server knows that the terminal can identify the integrity identifier in the positioning assistance information of the downlink positioning reference signal, or can identify the integrity related parameters in the positioning assistance information of the downlink positioning reference signal, etc.

B14. A capability to support monitoring the integrity of certain positioning manner Based on the indication information of this capability, the positioning server may know that the terminal is capable of monitoring the integrity of certain positioning manner (that is, the terminal can only monitor the integrity, and as for evaluating whether the current positioning manner satisfies the integrity requirement, the positioning server or a separate integrity evaluation server is relied upon to evaluate the integrity results). For example, the terminal reports its capability to support monitoring the integrity of DL-TDOA; based on the indication information of this capability, the positioning server knows that the terminal may provide measurement results related to DL-TDOA positioning, so that the positioning server or the separate integrity evaluation server can evaluate the integrity results of the current DL-TDOA positioning manner.

B15. A capability to support an evaluation of the integrity of certain positioning manner Based on the indication information of the capability, the positioning server may know that the terminal is capable of providing the integrity monitoring result of certain positioning manner. For example, the terminal reports its capability to support an evaluation of the integrity of DL-TDOA and downlink angle-of-departure (DL-AoD). Based on the indication information of this capability, the positioning server knows that the terminal may provide the integrity monitoring results (that is, whether the integrity requirement is met) of DL-TDOA and DL-AoD.

B16. A capability to support an integrity exclusion of certain positioning manner Based on the indication information of the capability, the positioning server may know that the terminal is capable of excluding those positioning reference signal transmission points in the certain positioning manner that do not meet the integrity requirement, or is capable of retaining those positioning reference signal transmission points in the certain positioning manner that meet the integrity requirement. For example, the terminal reports its capability to support the integrity exclusion of DL-TDOA. Based on the indication information of this capability, the positioning server knows the TRPs from which the PRSs used in the DL-TDOA positioning meeting the integrity requirement performed by the terminal are sent.

B17. A capability to support an integrity correction of certain positioning manner Based on the indication information of the capability, the positioning server may know that the terminal is capable of providing the integrity correction of certain positioning manner. For example, the terminal reports its capability to support the integrity correction of DL-TDOA; and based on the indication information of this capability, the positioning server knows that the terminal may provide the error correction value of DL-TDOA, so as to assist the positioning server in performing error correction on the DL-TDOA positioning manner.

B18. A capability to support monitoring the integrity of certain positioning assistance data Based on the indication information of this capability, the positioning server may know that the terminal can monitor the integrity of certain positioning assistance data (that is, the terminal can only monitor the integrity, and as for evaluating whether the current positioning assistance data satisfies the integrity requirement, the positioning server or a separate integrity evaluation server is relied upon to evaluate the integrity results). For example, the terminal reports its capability to support monitoring the integrity of the DL PRS positioning assistance data. Based on this capability, the positioning service knows that the terminal may provide measurement results of DL PRS, so that the positioning server or a separate integrity evaluation server may evaluate the integrity result (whether it has integrity, whether it is usable, etc.) of the monitored DL PRS.

B19. A capability to support an evaluation of the integrity of certain positioning assistance data Based on the indication information of the capability, the positioning server may know that the terminal is capable of providing the integrity monitoring result of certain positioning assistance data. For example, the terminal reports its capability to support the integrity evaluation of GNSS ephemeris assistance data. Based on the indication information of this capability, the positioning server knows that the terminal may provide the integrity monitoring result (that is, whether the integrity requirement is met) of the GNSS ephemeris assistance data.

B20. A capability to support an integrity exclusion of certain positioning assistance data Based on the indication information of the capability, the positioning server may know what positioning assistance data not meeting the integrity requirement the terminal is capable of excluding, or what positioning assistance data meeting the integrity requirement the terminal is capable of retaining. For example, the terminal reports its capability to support the integrity exclusion of GNSS ephemeris assistance data and DL PRS positioning assistance data. Based on the indication information of the capability, the positioning server knows what GNSS ephemeris assistance data in the obtained GNSS ephemeris assistance data the terminal can identify as meeting the integrity requirement or not meeting the integrity requirement; and knows what DL PRS positioning assistance data in the obtained DL PRS positioning assistance data the terminal can identify as not meeting the integrity requirement or meeting the integrity requirement.

B21. A capability to support an integrity correction of certain positioning assistance data Based on the indication information of the capability, the positioning server may know that the terminal is capable of providing the integrity correction of certain positioning assistance data. For example, the terminal reports its capability to support the integrity correction of the DL PRS positioning assistance data. Based on the indication information of the above capability, the positioning server knows that the terminal may provide the integrity correction value of the monitored DL PRS positioning assistance data, so as to assist the positioning server in correcting the error caused by the DL PRS positioning assistance data.

Step S12, the positioning server obtains the integrity capability information of the terminal, and performs positioning related operations based on the obtained integrity capability information, including triggering the positioning integrity monitoring process, triggering the positioning integrity evaluation process, triggering the positioning integrity exclusion process, triggering the positioning integrity correction process, selecting an appropriate positioning manner for the terminal based on the integrity requirement, sending the integrity requirement to the terminal as a requirement of positioning QoS or positioning assistance data, and the like.

For example, based on the capability to support monitoring the positioning integrity reported by the terminal, the positioning server triggers the terminal to monitor the integrity of certain positioning manner or certain positioning assistance data;

for example, based on the capability to support an evaluation of the positioning integrity reported by the terminal, the positioning server triggers the terminal to perform integrity monitoring on certain positioning manner or certain positioning assistance data and provide the integrity monitoring result;

for example, based on the capability to support an integrity exclusion reported by the terminal, the positioning server triggers the terminal to perform integrity exclusion on certain positioning manner or certain positioning assistance data;

for example, based on the capability to support an integrity correction reported by the terminal, the positioning server triggers the terminal to perform an integrity correction process on certain positioning manner or certain positioning assistance data;

for example, based on the capability to support an integrity feature reported by the terminal, the positioning server selects a positioning manner, that may provide integrity, for using in the current positioning;

for example, based on the capability to support an integrity feature reported by the terminal, the positioning server may send the positioning QoS including the integrity requirement to the terminal, and the terminal selects an appropriate positioning manner based on the integrity requirement;

for example, based on the capability to support an integrity feature reported by the terminal, the positioning server may send the positioning assistance data including the integrity requirement to the terminal, and the terminal selects the appropriate positioning assistance data based on the integrity requirement.

Situation 2. The positioning server obtaining the integrity capability of the radio access network (RAN) side node Step S21, based on a request of the positioning server, the RAN side node reports its integrity capability information; or the RAN side node may proactively report the integrity capability information of the RAN side node to the positioning server for some reasons (for example, when establishing a connection with the positioning server or updating the RAN side node configuration with the positioning server).

The integrity capability of the RAN side node may include one or more of the following.

C11. A capability to support an integrity feature

Based on the indication information of the capability, the positioning server may know that the RAN side node supports the currently introduced integrity feature and the RAN side node may provide integrity related services, for example, according to the indication information of the capability, the positioning server knows that the RAN side node can identify an integrity identifier, or can identify integrity related parameters, etc.

C12. A capability to support an integrity feature of certain positioning manner

Based on the indication information of this capability, the positioning server may know that the RAN side node supports the integrity feature introduced for certain positioning manner and the RAN side node may provide integrity related services. For example, according to the indication information of this capability, the positioning server knows that the RAN side node can identify the integrity identifier in the BDS positioning manner, or can identify the integrity related parameters in the BDS positioning manner, etc.

C13. A capability to support an integrity feature of certain positioning reference signal Based on the indication information of the capability, the positioning server may know that the RAN side node supports the integrity feature introduced for certain positioning reference signal and the RAN side node may provide integrity related services, for example, according to the indication information of the capability, the positioning server knows that the RAN side node can identify the integrity identifier in the positioning assistance information of the uplink positioning reference signal, or can identify the integrity related parameters in the positioning assistance information of the uplink positioning reference signal, etc.

C14. A capability to support monitoring the integrity of certain positioning manner Based on the indication information of this capability, the positioning server may know that the RAN side node is capable of monitoring the integrity of certain positioning manner (that is, the RAN side node can only monitor the integrity, and as for evaluating whether the current positioning manner satisfies the integrity requirement, the positioning server or a separate integrity evaluation server is relied upon to evaluate the integrity results). For example, the RAN side node reports its capability to support monitoring the integrity of BDS; based on the indication information of this capability, the positioning server knows that the RAN side node may provide measurement results related to BDS positioning, so that the positioning server or the separate integrity evaluation server can evaluate the integrity results of the current BDS positioning manner.

C15. A capability to support an evaluation of the integrity of certain positioning manner Based on the indication information of the capability, the positioning server may know that the RAN side node is capable of providing the integrity monitoring result of certain positioning manner. For example, the RAN side node reports its capability to support an evaluation of the integrity of BDS. Based on the indication information of this capability, the positioning server knows that the RAN side node may provide the integrity monitoring results (that is, whether the integrity requirement is met) of BDS.

C16. A capability to support an integrity exclusion of certain positioning manner Based on the indication information of the capability, the positioning server may know that the RAN side node is capable of excluding those positioning reference signal transmission points in the certain positioning manner that do not meet the integrity requirement, or is capable of retaining those positioning reference signal transmission points in the certain positioning manner that meet the integrity requirement. For example, the RAN side node reports its capability to support the integrity exclusion of BDS. Based on the indication information of this capability, the positioning server knows the TRPs from which the PRSs used in the BDS positioning meeting the integrity requirement performed by the RAN side node are sent.

C17. A capability to support an integrity correction of certain positioning manner Based on the indication information of the capability, the positioning server may know that the RAN side node is capable of providing the integrity correction of certain positioning manner. For example, the RAN side node reports its capability to support the integrity correction of UL TDOA; and based on the indication information of this capability, the positioning server knows that the RAN side node may provide the error correction value of UL TDOA, so as to assist the positioning server in performing error correction on the UL TDOA positioning manner.

C18. A capability to support monitoring the integrity of certain positioning assistance data Based on the indication information of this capability, the positioning server may know that the RAN side node can monitor the integrity of certain positioning assistance data (that is, the RAN side node can only monitor the integrity, and as for evaluating whether the current positioning assistance data satisfies the integrity requirement, the positioning server or a separate integrity evaluation server is relied upon to evaluate the integrity results). For example, the RAN side node reports its capability to support monitoring the integrity of the GNSS ephemeris assistance data. Based on this capability, the positioning service knows that the RAN side node may provide measurement results of the GNSS ephemeris, so that the positioning server or a separate integrity evaluation server may evaluate the integrity result (whether it has integrity, whether it is usable, etc.) of the monitored GNSS ephemeris.

C19. A capability to support an evaluation of the integrity of certain positioning assistance data Based on the indication information of the capability, the positioning server may know that the RAN side node is capable of providing the integrity monitoring result of certain positioning assistance data. For example, the RAN side node reports its capability to support the integrity evaluation of GNSS ephemeris assistance data. Based on the indication information of this capability, the positioning server knows that the RAN side node may provide the integrity monitoring result (that is, whether the integrity requirement is met) of the GNSS ephemeris assistance data.

C20. A capability to support an integrity exclusion of certain positioning assistance data Based on the indication information of the capability, the positioning server may know what positioning assistance data not meeting the integrity requirement the RAN side node is capable of excluding, or what positioning assistance data meeting the integrity requirement the RAN side node is capable of retaining. For example, the RAN side node reports its capability to support the integrity exclusion of GNSS ephemeris assistance data. Based on the indication information of the capability, the positioning server knows what GNSS ephemeris assistance data in the obtained GNSS ephemeris assistance data the RAN side node can identify as meeting the integrity requirement or not meeting the integrity requirement.

C21. A capability to support an integrity correction of certain positioning assistance data Based on the indication information of the capability, the positioning server may know that the RAN side node is capable of providing the integrity correction of certain positioning assistance data. For example, the RAN side node reports its capability to support the integrity correction of the UL positioning reference signal positioning assistance data. Based on the indication information of the above capability, the positioning server knows that the RAN side node may provide the integrity correction value of the monitored UL positioning reference signal positioning assistance data, so as to assist the positioning server in correcting the error caused by the UL positioning reference signal positioning assistance data.

Step S22, the positioning server obtains the integrity capability information of the RAN side node, and performs positioning related operations based on the obtained integrity capability information, including triggering the positioning integrity evaluation process, triggering the positioning integrity exclusion process, triggering the positioning integrity correction process, selecting an appropriate positioning manner for the RAN side node based on the integrity requirement, sending the integrity requirement to the RAN side node as a requirement of positioning QoS or positioning assistance data, and the like.

It should be noted that some embodiments of the present disclosure can ensure that the positioning server can obtain the relevant integrity capability in time, thereby assisting positioning, avoiding the occurrence of large error in position estimation, and improving the positioning accuracy of the positioning server.

Figure 5:
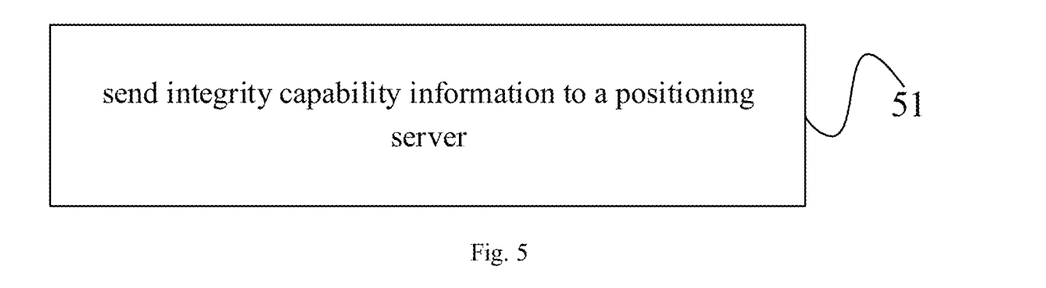
FIG. 5 is a schematic flowchart of a capability sending method according to some embodiments of the present disclosure.

As shown in FIG. 5, the capability sending method according to some embodiments of the present disclosure is applied to the first device and includes:

Step 51: sending integrity capability information to a positioning server, the integrity capability information being used for assisting the positioning server in performing a positioning operation;
wherein, the first device is a terminal or an access network side node;
wherein, the integrity capability information is used for indicating at least one of the following:
a capability to support an integrity;
a capability to support monitoring the integrity of a target object, indicating that the first device is capable of monitoring the integrity of the target object; or
a capability to support a first-device-based integrity application of the target object;
wherein, the target object includes: a first positioning manner and/or first positioning assistance data.

Specifically, the capability to support the integrity includes at least one of the following:

a capability to support an integrity based on a second positioning manner; or
a capability to support an integrity based on a first positioning reference signal.

Further, the first positioning manner and the second positioning manner each include at least one of the following:
global navigation satellite system (GNSS) positioning manner;
Bluetooth positioning manner;
terrestrial beacon system (TBS) positioning manner;
sensor positioning manner;
downlink time difference of arrival (DL-TDOA) positioning manner;
uplink time difference of arrival (UL-TDOA) positioning manner;
multi-round round trip time (Multi-RTT) positioning manner;
downlink angle-of-departure (DL-AoD) positioning manner; or
uplink angle-of-arrival (UL-AOA) positioning manner.

Specifically, the capability to support the first-device-based integrity application of the target object includes at least one of the following:
a capability to support an evaluation of the integrity of the target object, indicating that the first device is capable of providing an integrity monitoring result of the target object;
a capability to support an integrity exclusion of the target object, indicating that the first device is capable of excluding the target object not meeting an integrity requirement or retaining the target object meeting the integrity requirement; or
a capability to support an integrity correction of the target object, indicating that the first device is capable of providing the integrity correction of the target object.

Optionally, an implementation of step 51 includes:
receiving integrity capability request information sent by the positioning server;
sending the integrity capability information to the positioning server according to the integrity capability request information.

Optionally, another implementation of step 51 includes:
reporting proactively the integrity capability information to the positioning server.

It should be noted that, all the descriptions about the first device in the above embodiments are applicable to the embodiments of the capability sending method, and the same technical effect can also be achieved.

Figure 6:
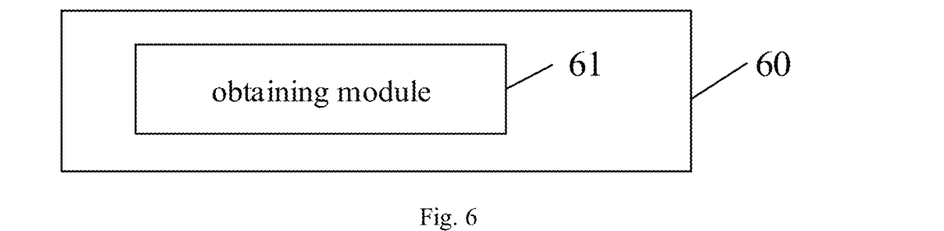
FIG. 6 is a schematic block diagram of a positioning server according to some embodiments of the present disclosure.

As shown in FIG. 6, some embodiments of the present disclosure provide a positioning server 60, including:
an obtaining module 61, configured to obtain integrity capability information sent by a first device;
wherein, the integrity capability information is used for assisting the positioning server in performing a positioning operation, and the first device is a terminal or an access network side node;
wherein, the integrity capability information is used for indicating at least one of the following:
a capability to support an integrity;
a capability to support monitoring the integrity of a target object, indicating that the first device is capable of monitoring the integrity of the target object; or
a capability to support a first-device-based integrity application of the target object;
wherein, the target object includes: a first positioning manner and/or first positioning assistance data.

Specifically, the capability to support the integrity includes at least one of the following:
  a capability to support an integrity based on a second positioning manner; or
  a capability to support an integrity based on a first positioning reference signal.

Further, the first positioning manner and the second positioning manner each include at least one of the following:
  global navigation satellite system (GNSS) positioning manner;
  Bluetooth positioning manner;
  terrestrial beacon system (TBS) positioning manner;
  sensor positioning manner;
  downlink time difference of arrival (DL-TDOA) positioning manner;
  uplink time difference of arrival (UL-TDOA) positioning manner;
  multi-round round trip time (Multi-RTT) positioning manner;
  downlink angle-of-departure (DL-AoD) positioning manner; or
  uplink angle-of-arrival (UL-AOA) positioning manner.

Specifically, the capability to support the first-device-based integrity application of the target object includes at least one of the following:
  a capability to support an evaluation of the integrity of the target object, indicating that the first device is capable of providing an integrity monitoring result of the target object;
  a capability to support an integrity exclusion of the target object, indicating that the first device is capable of excluding the target object not meeting an integrity requirement or retaining the target object meeting the integrity requirement; or
  a capability to support an integrity correction of the target object, indicating that the first device is capable of providing the integrity correction of the target object.

Optionally, the obtaining module 61 includes:
  a first sending unit, configured to send integrity capability request information to the first device;
  a first receiving unit, configured to receive integrity capability information fed back by the first device according to the integrity capability request information.

Optionally, the obtaining module 61 includes:
  a second receiving unit, configured to receive integrity capability information reported proactively by the first device.

It should be noted that the positioning server embodiments correspond to the above method embodiments in a one-to-one manner, and all the implementations of the above method embodiments are applicable to the positioning server embodiments, and the same technical effects can be achieved.

Figure 7:
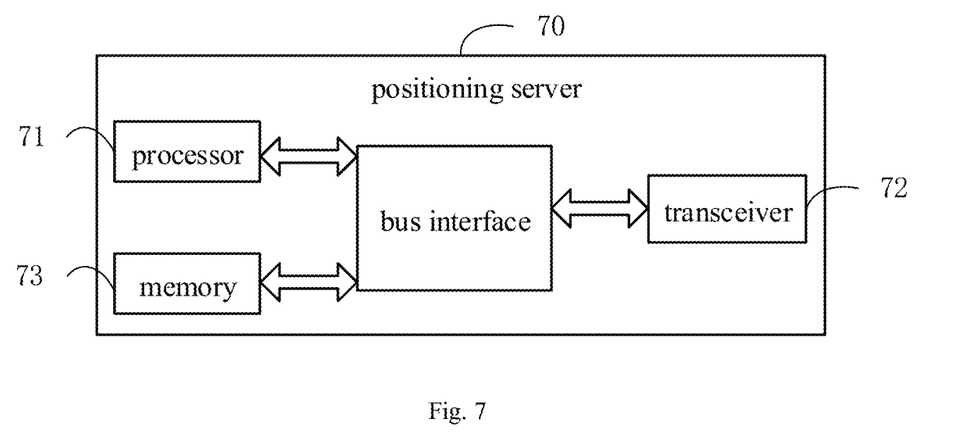
FIG. 7 is a structural diagram of a positioning server according to some embodiments of the present disclosure.

As shown in FIG. 7, some embodiments of the present disclosure further provide a positioning server 70, which includes a processor 71, a transceiver 72, a memory 73, and a program stored in the memory 73 and configured to run on the processor 71; wherein, the transceiver 72 is connected to the processor 71 and the memory 73 through a bus interface, wherein the processor 71 is configured to read the program in the memory, to implement the following process:
  obtaining integrity capability information sent by a first device;

wherein, the integrity capability information is used for assisting the positioning server in performing a positioning operation, and the first device is a terminal or an access network side node;

wherein, the integrity capability information is used for indicating at least one of the following:
  a capability to support an integrity;
  a capability to support monitoring the integrity of a target object, indicating that the first device is capable of monitoring the integrity of the target object; or
  a capability to support a first-device-based integrity application of the target object;
  wherein, the target object includes: a first positioning manner and/or first positioning assistance data.

It should be noted that in FIG. 7, the bus architecture may include any number of interconnected buses and bridges, specifically various circuits such as one or more processors represented by the processor 71 and the memory represented by the memory 73 are connected together. The bus architecture can also connect various other circuits such as peripheral devices, voltage regulators, power management circuits, etc., which are all known in the field, and therefore, will not be further described herein. The bus interface provides the interface. The transceiver 72 may be a plurality of elements, that is, including a transmitter and a receiver, and provide a unit for communicating with various other devices on the transmission medium. The processor 71 is responsible for managing the bus architecture and general processing, and the memory 73 can store data used by the processor 71 when performing operations.

Specifically, the capability to support the integrity includes at least one of the following:
  a capability to support an integrity based on a second positioning manner; or
  a capability to support an integrity based on a first positioning reference signal.

Further, the first positioning manner and the second positioning manner each include at least one of the following:
  global navigation satellite system (GNSS) positioning manner;
  Bluetooth positioning manner;
  terrestrial beacon system (TBS) positioning manner;
  sensor positioning manner;
  downlink time difference of arrival (DL-TDOA) positioning manner;
  uplink time difference of arrival (UL-TDOA) positioning manner;
  multi-round round trip time (Multi-RTT) positioning manner;
  downlink angle-of-departure (DL-AoD) positioning manner; or
  uplink angle-of-arrival (UL-AOA) positioning manner.

Specifically, the capability to support the first-device-based integrity application of the target object includes at least one of the following:
  a capability to support an evaluation of the integrity of the target object, indicating that the first device is capable of providing an integrity monitoring result of the target object;
  a capability to support an integrity exclusion of the target object, indicating that the first device is capable of excluding the target object not meeting an integrity requirement or retaining the target object meeting the integrity requirement; or a capability to support an integrity correction of the target object, indicating that the first device is capable of providing the integrity correction of the target object.

Optionally, during the obtaining the integrity capability information sent by the first device, the processor is configured to execute the program to implement the following steps:

sending integrity capability request information to the first device through the transceiver 72;

receiving the integrity capability information fed back by the first device according to the integrity capability request information.

Optionally, the processor is configured to execute the program to implement the following step:

receiving the integrity capability information reported proactively by the first device through the transceiver 72.

Some embodiments of the present disclosure further provide a computer-readable storage medium storing thereon a computer program, wherein, the computer program is configured to be executed by a processor to implement the steps of the capability obtaining method effected by the positioning server.

Figure 8:
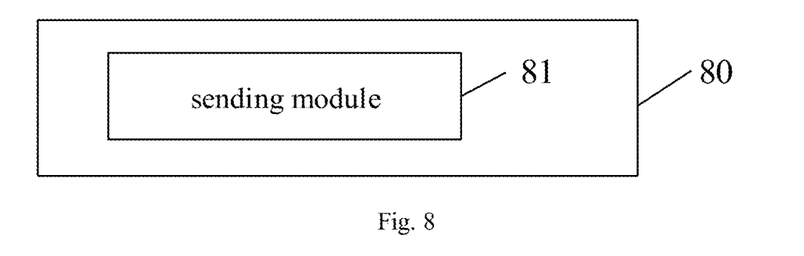
FIG. 8 is a schematic block diagram of a first device according to some embodiments of the present disclosure.

As shown in FIG. 8, some embodiments of the present disclosure provide a device, the device is a first device 80, including:

a sending module 81, configured to send integrity capability information to a positioning server, the integrity capability information being used for assisting the positioning server in performing a positioning operation;

wherein, the first device is a terminal or an access network side node;

wherein, the integrity capability information is used for indicating at least one of the following:

a capability to support an integrity;

a capability to support monitoring the integrity of a target object, indicating that the first device is capable of monitoring the integrity of the target object; or a capability to support a first-device-based integrity application of the target object;

wherein, the target object includes: a first positioning manner and/or first positioning assistance data.

Specifically, the capability to support the integrity includes at least one of the following:

a capability to support an integrity based on a second positioning manner; or a capability to support an integrity based on a first positioning reference signal.

Further, the first positioning manner and the second positioning manner each include at least one of the following:

global navigation satellite system (GNSS) positioning manner;

Bluetooth positioning manner;

terrestrial beacon system (TBS) positioning manner;

sensor positioning manner;

downlink time difference of arrival (DL-TDOA) positioning manner;

uplink time difference of arrival (UL-TDOA) positioning manner;

multi-round round trip time (Multi-RTT) positioning manner;

downlink angle-of-departure (DL-AoD) positioning manner; or uplink angle-of-arrival (UL-AOA) positioning manner.

Specifically, the capability to support the first-device-based integrity application of the target object includes at least one of the following:

a capability to support an evaluation of the integrity of the target object, indicating that the first device is capable of providing an integrity monitoring result of the target object;

a capability to support an integrity exclusion of the target object, indicating that the first device is capable of excluding the target object not meeting an integrity requirement or retaining the target object meeting the integrity requirement; or a capability to support an integrity correction of the target object, indicating that the first device is capable of providing the integrity correction of the target object.

Optionally, the sending module 81 includes:

a third receiving unit, configured to receive integrity capability request information sent by the positioning server through the transceiver;

a second sending unit, configured to send the integrity capability information to the positioning server according to the integrity capability request information.

Optionally, the sending module 81 includes:

a reporting unit, configured to report proactively the integrity capability information to the positioning server through the transceiver.

It should be noted that the device embodiments correspond to the above method embodiments in a one-to-one manner, and all the implementations of the above method embodiments are applicable to the device embodiments, and the same technical effects can be achieved.

Figure 9:
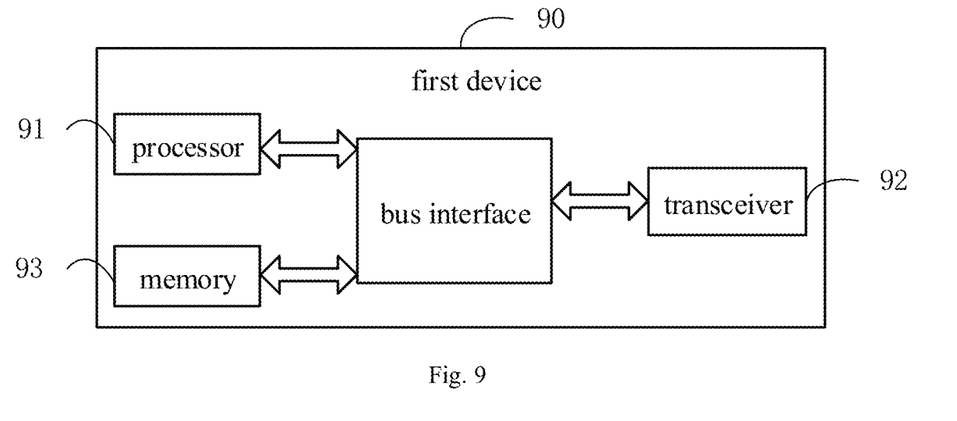
FIG. 9 is structural diagram of a first device according to some embodiments of the present disclosure.

As shown in FIG. 9, some embodiments of the present disclosure further provide a device, which is a first device 90, including a processor 91, a transceiver 92, a memory 93, and a program stored in the memory 93 and configured to run on the processor 91; wherein, the transceiver 92 is connected to the processor 91 and the memory 93 through the bus interface, wherein the processor 91 is configured to read the program in the memory, to implement the following process:

sending integrity capability information to a positioning server through the transceiver 92, the integrity capability information being used for assisting the positioning server in performing a positioning operation;

wherein, the first device is a terminal or an access network side node;

wherein, the integrity capability information is used for indicating at least one of the following:

a capability to support an integrity;

a capability to support monitoring the integrity of a target object, indicating that the first device is capable of monitoring the integrity of the target object; or a capability to support a first-device-based integrity application of the target object;

wherein, the target object includes: a first positioning manner and/or first positioning assistance data.

It should be noted that in FIG. 9, the bus architecture may include any number of interconnected buses and bridges, specifically various circuits such as one or more processors represented by the processor 91 and the memory represented by the memory 93 are connected together. The bus architecture can also connect various other circuits such as peripheral devices, voltage regulators, power management circuits, etc., which are all known in the field, and therefore, will not be further described herein. The bus interface provides the interface. The transceiver 92 may be a plurality of elements, that is, including a transmitter and a receiver, and provide a unit for communicating with various other devices on the transmission medium. The processor 91 is responsible for managing the bus architecture and general processing, and the memory 93 can store data used by the processor 91 when performing operations.

Specifically, the capability to support the integrity includes at least one of the following:
- a capability to support an integrity based on a second positioning manner; or
- a capability to support an integrity based on a first positioning reference signal.

Further, the first positioning manner and the second positioning manner each include at least one of the following:
- global navigation satellite system (GNSS) positioning manner;
- Bluetooth positioning manner;
- terrestrial beacon system (TBS) positioning manner;
- sensor positioning manner;
- downlink time difference of arrival (DL-TDOA) positioning manner;
- uplink time difference of arrival (UL-TDOA) positioning manner;
- multi-round round trip time (Multi-RTT) positioning manner;
- downlink angle-of-departure (DL-AoD) positioning manner; or
- uplink angle-of-arrival (UL-AOA) positioning manner.

Specifically, the capability to support the first-device-based integrity application of the target object includes at least one of the following:
- a capability to support an evaluation of the integrity of the target object, indicating that the first device is capable of providing an integrity monitoring result of the target object;
- a capability to support an integrity exclusion of the target object, indicating that the first device is capable of excluding the target object not meeting an integrity requirement or retaining the target object meeting the integrity requirement; or
- a capability to support an integrity correction of the target object, indicating that the first device is capable of providing the integrity correction of the target object.

Optionally, during the sending the integrity capability information to the positioning server through the transceiver, the processor is configured to execute the program to implement the following steps:
- receiving integrity capability request information sent by the positioning server through the transceiver 92;
- sending the integrity capability information to the positioning server according to the integrity capability request information.

Optionally, during the sending the integrity capability information to the positioning server through the transceiver, the processor is configured to execute the program to implement the following step:
- reporting proactively the integrity capability information to the positioning server through the transceiver 92.

It should be noted that the first device may be a terminal or an access network side device. Specifically, the access network side device may be a base transceiver station (BTS) in global system of mobile communication (GSM) or code division multiple access (CDMA), or a NodeB (NB) in wideband code division multiple access (WCDMA), or an evolved Node B (eNB or eNodeB) in LTE, or a relay station or access point, or a next generation Node B (ng-NB) in a future 5G network, or a central unit (CU) or distributive unit (DU), etc., and the present disclosure is not limited thereto.

Some embodiments of the present disclosure further provide a computer-readable storage medium storing thereon a computer program, wherein the computer program is configured to be executed by a processor to implement the steps of the capability sending method applied to the first device.

Various modules, units, subunits, or submodules may be one or more integrated circuits configured to implement the above method, such as: one or more application specific integrated circuits (ASICs), or one or more digital signal processors (DSPs), or one or more field programmable gate arrays (FPGAs), etc. Further, when one of the above modules is implemented in the form of program codes called by a processing element, the processing element may be a general-purpose processor, such as a central processing unit (CPU) or other processor that can call program code. Optionally, these modules may be integrated together and implemented in the form of a system-on-a-chip (SOC).

The above are optional implementations of the present disclosure. It should be pointed out that, for a person skilled in the art, several improvements and modifications can be made without departing from the principles of the present disclosure. These improvements and modifications should also fall within the scope of the present disclosure.

What is claimed is:

1. A capability obtaining method, effected by a positioning server, comprising:
   obtaining integrity capability information sent by a first device;
   wherein, the integrity capability information is used for assisting the positioning server in performing a positioning operation, and the first device is a terminal or an access network side node;
   wherein, the integrity capability information is used for indicating at least one of the following:
   a capability to support an integrity, the integrity being a measure of confidence in positioning accuracy;
   a capability to support monitoring the integrity of a target object, indicating that the first device is capable of monitoring the integrity of the target object; or
   a capability to support a first-device-based integrity application of the target object;
   wherein, the target object comprises: a first positioning manner and/or first positioning assistance data;
   wherein the capability to support the first-device-based integrity application of the target object comprises at least one of the following:
   an evaluation capability to support an evaluation of the integrity of the target object, indicating that the first device is capable of providing an integrity monitoring result of the target object;
   an exclusion capability to support an integrity exclusion of the target object, indicating that the first device is capable of excluding the target object not meeting an integrity requirement or retaining the target object meeting the integrity requirement; or
   a correction capability to support an integrity correction of the target object, indicating that the first device is capable of providing the integrity correction of the target object.

2. The capability obtaining method according to claim 1, wherein the capability to support the integrity comprises at least one of the following:
   a capability to support an integrity based on a second positioning manner; or a capability to support an integrity based on a first positioning reference signal.

3. The capability obtaining method according to claim 2, wherein the first positioning manner and the second positioning manner each comprise at least one of the following:
global navigation satellite system (GNSS) positioning manner;
Bluetooth positioning manner;
terrestrial beacon system (TBS) positioning manner;
sensor positioning manner;
downlink time difference of arrival (DL-TDOA) positioning manner;
uplink time difference of arrival (UL-TDOA) positioning manner;
multi-round round trip time (Multi-RTT) positioning manner;
downlink angle-of-departure (DL-AoD) positioning manner; or
uplink angle-of-arrival (UL-AOA) positioning manner.

4. The capability obtaining method according to claim 1, wherein the obtaining the integrity capability information sent by the first device comprises:
sending integrity capability request information to the first device;
receiving the integrity capability information fed back by the first device according to the integrity capability request information;
or,
wherein the obtaining the integrity capability information sent by the first device comprises:
receiving the integrity capability information reported proactively by the first device.

5. A capability sending method, effected by a first device, comprising:
sending integrity capability information to a positioning server, the integrity capability information being used for assisting the positioning server in performing a positioning operation;
wherein, the first device is a terminal or an access network side node;
wherein, the integrity capability information is used for indicating at least one of the following:
a capability to support an integrity, the integrity being a measure of confidence in positioning accuracy;
a capability to support monitoring the integrity of a target object, indicating that the first device is capable of monitoring the integrity of the target object; or
a capability to support a first-device-based integrity application of the target object;
wherein, the target object comprises: a first positioning manner and/or first positioning assistance data;
wherein the capability to support the first-device-based integrity application of the target object comprises at least one of the following:
an evaluation capability to support an evaluation of the integrity of the target object, indicating that the first device is capable of providing an integrity monitoring result of the target object;
an exclusion capability to support an integrity exclusion of the target object, indicating that the first device is capable of excluding the target object not meeting an integrity requirement or retaining the target object meeting the integrity requirement; or
a correction capability to support an integrity correction of the target object, indicating that the first device is capable of providing the integrity correction of the target object.

6. The capability sending method according to claim 5, wherein the capability to support the integrity comprises at least one of the following:
a capability to support an integrity based on a second positioning manner; or
a capability to support an integrity based on a first positioning reference signal.

7. The capability sending method according to claim 6, wherein the first positioning manner and the second positioning manner each comprise at least one of the following:
global navigation satellite system (GNSS) positioning manner;
Bluetooth positioning manner;
terrestrial beacon system (TBS) positioning manner;
sensor positioning manner;
downlink time difference of arrival (DL-TDOA) positioning manner;
uplink time difference of arrival (UL-TDOA) positioning manner;
multi-round round trip time (Multi-RTT) positioning manner;
downlink angle-of-departure (DL-AoD) positioning manner; or
uplink angle-of-arrival (UL-AOA) positioning manner.

8. The capability sending method according to claim 5, wherein the sending the integrity capability information to the positioning server comprises:
receiving integrity capability request information sent by the positioning server;
sending the integrity capability information to the positioning server according to the integrity capability request information;
or,
wherein the sending the integrity capability information to the positioning server comprises:
reporting proactively the integrity capability information to the positioning server.

9. A positioning server, comprising: a memory, a processor, and a program stored in the memory and configured to be executed by the processor; wherein the processor is configured to execute the program to implement the steps of the capability obtaining method according to claim 1.

10. The positioning server according to claim 9, wherein the capability to support the integrity comprises at least one of the following:
a capability to support an integrity based on a second positioning manner; or
a capability to support an integrity based on a first positioning reference signal.

11. The positioning server according to claim 10, wherein the first positioning manner and the second positioning manner each comprise at least one of the following:
global navigation satellite system (GNSS) positioning manner;
Bluetooth positioning manner;
terrestrial beacon system (TBS) positioning manner;
sensor positioning manner;
downlink time difference of arrival (DL-TDOA) positioning manner;
uplink time difference of arrival (UL-TDOA) positioning manner;
multi-round round trip time (Multi-RTT) positioning manner;
downlink angle-of-departure (DL-AoD) positioning manner; or
uplink angle-of-arrival (UL-AOA) positioning manner.

12. The positioning server according to claim 9, wherein during the obtaining the integrity capability information sent by the first device, the processor is configured to execute the program to implement the following steps:

sending integrity capability request information to the first device;

receiving the integrity capability information fed back by the first device according to the integrity capability request information;

or, wherein the processor is configured to execute the program to implement the following step:

receiving the integrity capability information reported proactively by the first device.

13. A device, the device being a first device, comprising: a transceiver, a memory, a processor, and a program stored in the memory and configured to be executed by the processor; wherein the processor is configured to execute the program to implement the following step:

sending integrity capability information to a positioning server through the transceiver, the integrity capability information being used for assisting the positioning server in performing a positioning operation;

wherein, the first device is a terminal or an access network side node;

wherein, the integrity capability information is used for indicating at least one of the following:

a capability to support an integrity, the integrity being a measure of confidence in positioning accuracy;

a capability to support monitoring the integrity of a target object, indicating that the first device is capable of monitoring the integrity of the target object; or a capability to support a first-device-based integrity application of the target object;

wherein, the target object comprises: a first positioning manner and/or first positioning assistance data;

wherein the capability to support the first-device-based integrity application of the target object comprises at least one of the following:

an evaluation capability to support an evaluation of the integrity of the target object, indicating that the first device is capable of providing an integrity monitoring result of the target object;

an exclusion capability to support an integrity exclusion of the target object, indicating that the first device is capable of excluding the target object not meeting an integrity requirement or retaining the target object meeting the integrity requirement; or a correction capability to support an integrity correction of the target object, indicating that the first device is capable of providing the integrity correction of the target object.

14. The device according to claim 13, wherein the capability to support the integrity comprises at least one of the following:

a capability to support an integrity based on a second positioning manner; or a capability to support an integrity based on a first positioning reference signal.

15. The device according to claim 14, wherein the first positioning manner and the second positioning manner each comprise at least one of the following:

global navigation satellite system (GNSS) positioning manner;

Bluetooth positioning manner;

terrestrial beacon system (TBS) positioning manner;

sensor positioning manner;

downlink time difference of arrival (DL-TDOA) positioning manner;

uplink time difference of arrival (UL-TDOA) positioning manner;

multi-round round trip time (Multi-RTT) positioning manner;

downlink angle-of-departure (DL-AoD) positioning manner; or uplink angle-of-arrival (UL-AOA) positioning manner.

16. The device according to claim 13, wherein during the sending the integrity capability information to the positioning server through the transceiver, the processor is configured to execute the program to implement the following steps:

receiving integrity capability request information sent by the positioning server through the transceiver;

sending the integrity capability information to the positioning server according to the integrity capability request information;

or, wherein during the sending the integrity capability information to the positioning server through the transceiver, the processor is configured to execute the program to implement the following step:

reporting proactively the integrity capability information to the positioning server through the transceiver.

\* \* \* \* \*